United States Patent [19]

Fischer

[11] Patent Number: 4,915,223
[45] Date of Patent: Apr. 10, 1990

[54] EXPANSIBLE PLUG DEVICE

[75] Inventor: Artur Fischer, Waldachtal, Fed. Rep. of Germany

[73] Assignee: fischerwerke, Artur Fischer GmbH & Co.KG, Tumlingen/Waldachtal, Fed. Rep. of Germany

[21] Appl. No.: 320,229

[22] Filed: Mar. 7, 1989

[30] Foreign Application Priority Data

Mar. 7, 1988 [DE] Fed. Rep. of Germany ....... 3807368

[51] Int. Cl.⁴ .................. F16B 13/06; B65D 85/24
[52] U.S. Cl. .................................... 206/345; 206/347
[58] Field of Search ............... 206/347, 346, 345, 343, 206/341, 340, 338

[56] References Cited

U.S. PATENT DOCUMENTS

| 3,416,650 | 12/1968 | Mortensen | 206/338 |
| 4,043,452 | 8/1977 | Ross | 206/340 |
| 4,167,229 | 9/1979 | Keusch et al. | 206/343 |
| 4,388,934 | 6/1983 | Luke | 131/339 |
| 4,572,708 | 2/1986 | Fischer | 411/57 |

Primary Examiner—Paul T. Sewell
Assistant Examiner—Jacob K. Ackun, Jr.
Attorney, Agent, or Firm—Michael J. Striker

[57] ABSTRACT

An expansible sleeve storage device comprises a magazine provided with a plurality of trough-shaped holders which are arranged near one another and have elastic walls, each of the holders having at least one projection, and a plurality of expansible plugs each arranged in a respective one of the holders and having an annular groove in which the projection of a respective one of the holders engages.

8 Claims, 1 Drawing Sheet

EXPANSIBLE PLUG DEVICE

BACKGROUND OF THE INVENTION

The present invention relates to an expansible plug storage device. More particularly, it relates to an expansible plug storage device which includes a magazine with a plurality of expansible plugs each having a shaft and an expansion sleeve arranged on an expander member.

Conventionally, the expansible plugs are packaged loosely, and for insertion into bore holes of a masonry are individually removed by hand and introduced into the bore hole. For sliding the expansion sleeve onto an expander member which is formed as an expander cone, and thereby expanding the expansion sleeve, the shaft of the expansible plug can be provided with a slot or the like for a screwdriver. The expander member is supported on the bottom of the bore hole, while rotating of the shaft, it is screwed on a threaded bar formed on the expander member so that the expansion sleeve moves over the expander member and expands. Thereby the expansion sleeve can engage into an undercut of the bore hole and provide a form-locking connection between the expansible plug and masonry.

SUMMARY OF THE INVENTION

Accordingly, it is an object of the present invention to provide an expansible plug storing device which can store several expansible plugs for facilitating their mounting.

In keeping with these objects and with others which will become apparent hereinafter, one feature of the present invention resides, briefly stated, in an expansible plug storage device in which the expansible plugs are clamped in trough-shaped holders which are located near one another and have elastic walls, and each expansible plug is provided with an annular groove in which a projection formed on the holder is engaged.

When the expansible plugs are clamped in elastic holders which are preferably composed of synthetic plastic material and engage by projections extending into the annular grooves, they are protected against unintentional axial displacement. The holders together form a magazine which can accommodate for example 10 expansible plugs located in a row near one another. The mounting of an expansible plug is performed by holding the magazine in front of a bore hole so that the expansible plug to h=mounted is held forwardly of the bore hole, and then pressed or striken into the bore hole.

It suffices to deliver a respective pressure or impact against the shaft of the expansible plug to release the arresting connection between the annular groove and the holder. The arresting connection is however so stable that the neighboring expansible plug arranged in the magazine is not displaced out of its arresting position.

Advantageously, in accordance with another feature of the present invention, the holders extend over the end of the shaft, which faces away of the expansion sleeve. The outwardly extending part of the holder forms thereby a guiding trough or a guiding ring for a tool which cooperates with the end of the shaft, for example percussion screwdriver.

In accordance with a further feature of the present invention, the magazine of the inventive device can be formed as a one-piece integral synthetic plastic element. When the magazine is formed in accordance with this feature it is very inexpensive.

The annular groove can be formed by two neighboring parts, namely the expansion sleeve and the shaft of the expander member. It is possible that the mutually facing end surfaces of these parts are provided with a bevel so as to form a V-shaped annular groove. The projection provided on the holders can be formed with a corresponding profile.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
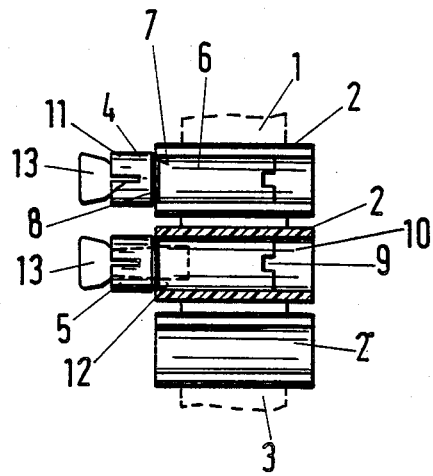
FIG. 1 is a view showing a plan view of an inventive storage device for expansible plugs.

An expansible plug storage device in accordance with the present invention has a magazine which is identified as a whole with reference numeral 1. The magazine 1 has a plurality of holders which are trough-shaped and connected with one another by a connecting web 3. The holders 2 together with the connecting web 3 form a one-piece integral synthetic plastic element.

The magazine 1 accommodates a plurality of expansible plugs 4,5 Each expansible plug includes an expansion sleeve and an expander member with a shaft 6. The expansible plugs are clamped in the holders 2 with their shaft 6. The holders 2 have projections which are identified with reference numeral 7. In turn, the expansible plugs 4, 5 are provided with V-shaped annular grooves 8 which preferably are formed between the expansion sleeve and the shaft 6 of each expansible plug. Projections 7 of the holders 2 engage in the annular grooves 8 of the expansible plugs 4, 5. For providing a fixed connection between the holders 2 and the expansible plugs, the projections 7 can be also formed as annular beads extending from the holders 2.

The expansible sleeve which is clamped in the magazine 1 has a slot which is formed on the end of its shaft. A screwdriver of percussion screwdriving device can be inserted in the slot 9. Each holder 2 insignificantly extends outwardly beyond the end of the shaft which faces away from the expansion sleeve. The outwardly extending part 10 of the holder 2 forms a guide for the tip of the screwdriver.

In the shown embodiment, annular groove 8 is located at a point in which the shaft 6 and an expansion sleeve 11 are in contact with one another. A threaded pin 12 of an expander member 13 extends through the expansion sleeve 11. The shaft 6 is screwed on the threaded pin 12, and the expansion sleeve 11 is fitted on the expander member 13. This is performed by turning the shaft 6 and abutting the expander member 13 against a bottom of the bore hole to prevent its co-rotation.

Figure 2:
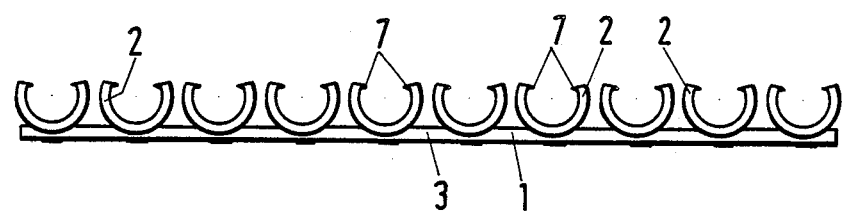
FIG. 2 is a side view of a magazine of the inventive expansible storage device.

FIG. 2 shows a magazine of the inventive expansible plug storage device without expansible plugs. The trough-shaped holders 2 have elastic walls with projections 7 formed on them. The projections 7 serve as arresting elements. The trough-shaped design of the holders 2 insures an especially simple manufacture of the magazine as an injection molded synthetic plastic element.

It will be understood that each of the elements described above, or two or more together, may also find a useful application in other types of constructions differing from the types described above.

While the invention has been illustrated and described as embodied in an expansible sleeve storage device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An expansible plug device, comprising a magazine provided with a plurality of trough-shaped holders which are arranged near one another and have elastic walls, each of said holders having at least one projection; and a plurality of expansible plugs each arranged in a respective one of said holders and having an annuler groove in which said projection of a respective one of said holders engages, each of said expansible plugs having an expansion sleeve and a shaft with an end facing away of said expansion sleeve, each of said holders extending outwardly beyond said end of said shaft.

2. An expansible plug device as defined in claim 1, wherein each of said holders has a portion which extends outwardly beyond said end of said shaft, said portion being formed as a ring.

3. An expansible plug device, comprising a magazine including a plurality of trough-shaped holders arranged near one another and having elastic walls, each of said holders having an inner surface with two opposite ends and at least one projection which is located adjacent to one of said ends only locally and does not extend over a whole length of said inner surface; and a plurality of separate expansible plugs, each plug being arranged in a respective one of said plurality of holders and having an annular groove in which said projection of a respective one of said holders engages.

4. An expansible plug device as defined in claim 3, wherein each of said holders has two such projections engaging in said annular groove of a respective one of said expansible plugs.

5. An expansible plug device as defined in claim 3, wherein said magazine has a common web, said holders having lower sides connected with said common web so as to form together a one-piece integral element.

6. An expansible plug device as defined in claim 5, wherein said one-piece integral element is composed of a synthetic plastic material.

7. An expansible plug device as defined in claim 3, wherein each of said expansible plugs has an expansion sleeve and a shaft, said annular groove being formed at a location between said expansion sleeve and said shaft.

8. An expansible plug device as defined in claim 7, wherein said annular groove has a V-shaped cross-section.

* * * * *